Apr. 3, 1923. 1,450,427.
W. H. CANNARD ET AL.
RECORDING MECHANISM AND DISSEMINATION METHOD.
FILED FEB. 24, 1922. 3 SHEETS—SHEET 1.

Inventors
William H. Cannard, and
Glenn A. Shaffer.
By
Attorney

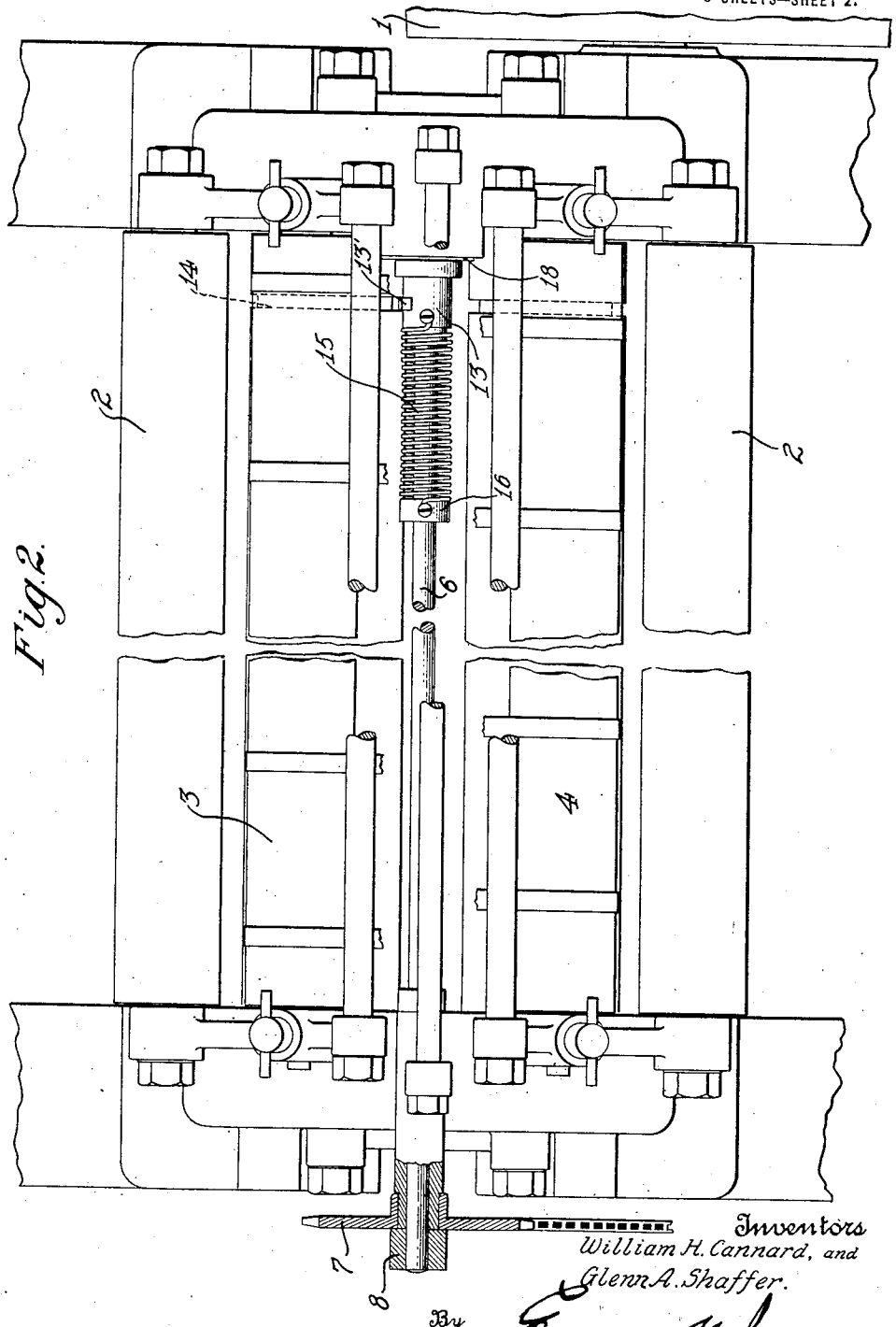

Apr. 3, 1923.

W. H. CANNARD ET AL.
RECORDING MECHANISM AND DISSEMINATION METHOD.
FILED FEB. 24, 1922.

Inventors
William H. Cannard, and
Glenn A. Shaffer.
By Edmund H. Parry
Attorney

Patented Apr. 3, 1923.

1,450,427

UNITED STATES PATENT OFFICE.

WILLIAM H. CANNARD AND GLENN A. SHAFFER, OF GREEN BAY, WISCONSIN, ASSIGNORS TO SAID CANNARD.

RECORDING MECHANISM AND DISSEMINATION METHOD.

Application filed February 24, 1922. Serial No. 538,992.

*To all whom it may concern:*

Be it known that we, WILLIAM H. CANNARD, a citizen of the United States, and GLENN A. SHAFFER, a subject of the King of Great Britain, residing at Green Bay, in the county of Brown and State of Wisconsin, have invented certain new and useful Improvements in Recording Mechanism and Dissemination Methods, of which the following is a specification, reference being had therein to the accompanying drawing.

This invention comprises a recording mechanism and dissemination method. While unrestricted in its application, it is especially useful in connection with interfolding machines of the type disclosed in our pending application Serial No. 504,023.

It is contemplated as an object of the present invention to provide a marking instrumentality in connection with a webfeeding apparatus so arranged and interconnected that a portion of the web will be cut or gouged at a point which will have a predetermined relation to a future operation of an interfolder; wherein the operative parts are so timed and correlated that the scored portion of the web will be at an outer edge of the interfolded article cut from the web and will serve to indicate a predetermined number of interfolded units.

It is also contemplated to provide a new method of separating and segregating piled articles cut from a web and interfolded, whereby there will be a simple and effective means of determining the line of demarkation between packages and the amount in each determined with mathematical certainty, as well as variable within certain limits.

A further object is to provide for adjustment of the marker or counting mechanism with relation to the other units of a cooperating machine whereby markings may be varied according to number or position; wherein the mechanism will be simple and positive in its operation, will not occupy much space in the machine, and will have few parts not easily disarranged. Other objects and advantages will in part be apparent and in part be brought out more fully in the description which follows.

In the accompanying drawings, there is illustrated an embodiment of the invention selected for the purpose of illustration, the following views being shown:

Fig. 2 is a view in top plan of the same, certain portions being broken away for the purpose of clear illustration;

Figure 1:
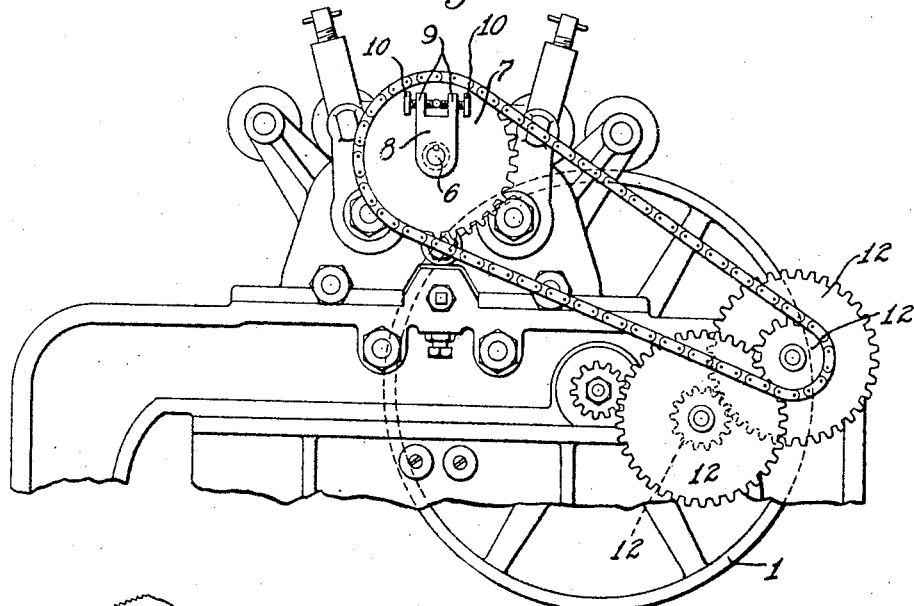
Figure 1 is a fragmentary view in front elevation showing a portion of an interfolding machine wherein the counting mechanism comprising this invention is embodied.
Figure 3:
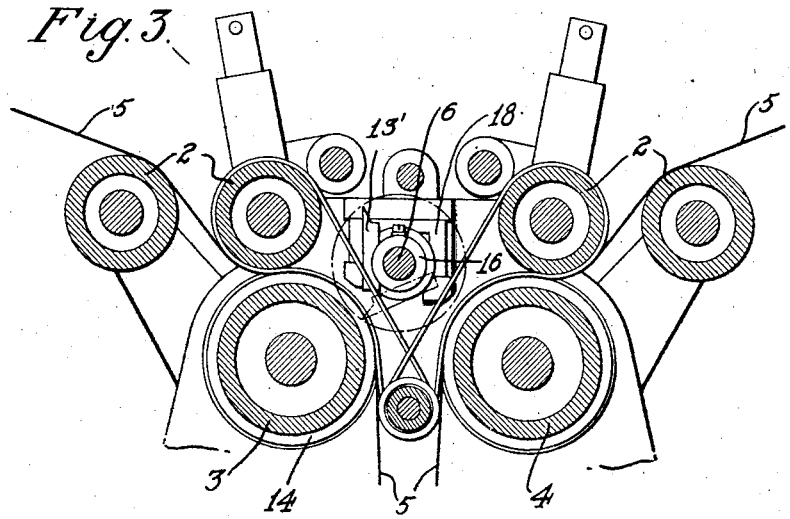
Fig. 3 is a view in vertical section through a portion of the machine and showing the relation of the counting mechanism to the other parts of the machine.

In these views, referring particularly to Figs. 1 and 3, the reference-character 1 designates a drive-pulley operatively connected with guide-rolls 2 and feed rolls 3 and 4 of an interfolding machine such as fully described in my pending application previously referred to.

A web of material 5 to be cut and interfolded is passed through the rolls, as indicated in Fig. 3, and means are provided for scoring, cutting, gouging or marking the web at a certain point and in a position which will afterwards be definitely placed on the finished or cut and interfolded article.

To this end, a shaft or carrier 6 is suitably journaled in bearings at opposite sides of the machine, and preferably disposed between two sets of the rolls as shown in Fig. 3, slightly to one side of the vertical center line thereof. On one end of this shaft there is loosely mounted a sprocket 7, and means are provided for fixing the sprocket to the shaft in adjustable relation thereto and changing this relation at will so as to vary the position of the cut in the web and also, to a certain extent, the time when such cut will be made.

As here shown, the shaft has keyed thereto an arm 8, at the outer end of which are ears 9, each having threaded thereinto adjusting screws 10, which engage and hold an end of a bolt 11, secured to the sprocket and extending outwardly from the surface thereof between the ends of the screws carried by the ears. The arrangement is such that the shaft and sprocket may be set at predetermined position so as to bring the cut or gouge in the web at a certain fixed point in the folded article, generally at its interfolded edge.

The sprocket is in driving connection with the main drive-pulley 1 of the machine, interposed reduction gearing 12 being arranged so that there will be about one revolution of the counting shaft to about fifty of the interfolding mechanism, and this variable by changing the gear relationship and also by changing the adjustment of the sprocket with relation to its supporting shaft.

Figure 4:
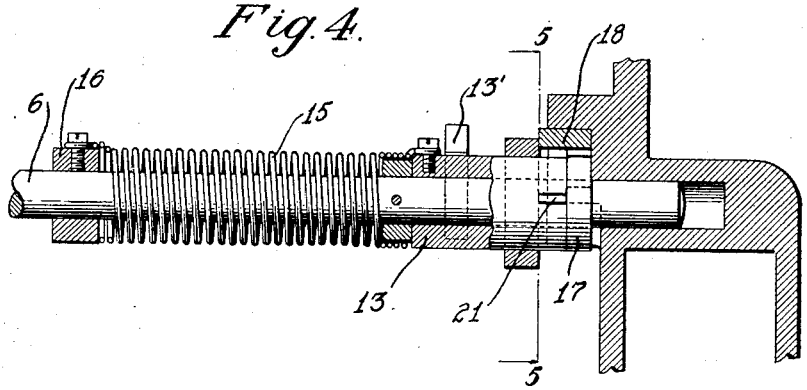
Fig. 4 is a detail view, partly in section, of a portion of the counting apparatus.
Figure 5:
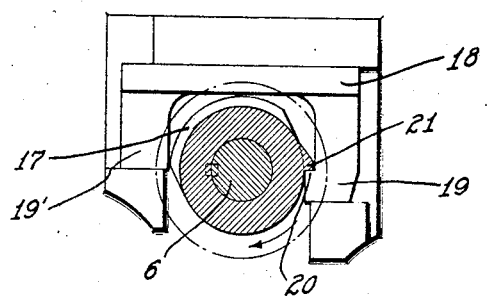
Fig. 5 is a view in transverse section on line 5—5, Fig. 4.

The mechanism herein disclosed for cutting, marking or gouging a portion of the web comprises, as best seen in Figs. 4 and 5, a sleeve 13, loosely mounted for rotative movement on the shaft 6. This sleeve carries a cutting knife 13', placed so as to enter a groove 14 disposed on one of the feed-rolls and cut into the web of material carried thereby, as best seen in Fig. 3 in dotted lines. The groove is also shown in plan in Fig. 2.

Secured to one end of the sleeve 13 is an end of a coil-spring 15, the other end being secured to a collar 16 carried by and made a part of the shaft 6. The outer end of the shaft 6 carries a cam 17 cooperating with a sliding ratchet 18 slidably mounted for movement in the casing in proximity to the cam. This ratchet-member has arms 19, 19', one of which carries an inwardly extending lug or projection 20, adapted to engage a corresponding lug 21, extending outwardly from the surface of the sleeve 13. The lug and knife are carried by the sleeve, which is loosely mounted on the shaft, while the cam is keyed directly to the shaft. In operation, the shaft is turned by the gearing and sprocket connection just described. This winds up the spring 15 until the cam 17 moves the ratchet 18 to the right in Fig. 5, whereupon the lug 21 will be released from the projection 20 and the tension of the spring will carry the sleeve around in the direction of the arrow and cause the knife to enter the web with a quick propulsive blow and rotate out of the plane of the web, or until the lug 21 engages the underneath portion of the arm 19', when the same operation is repeated. Each time the cam pushes the ratchet away from the lug the sleeve is given a half rotation and marks the web every other time. In other words, it moves twice but marks only once. This is to relieve tension in the spring and permit greater accuracy of adjustment and relation to the other parts of the machine.

Figure 7:
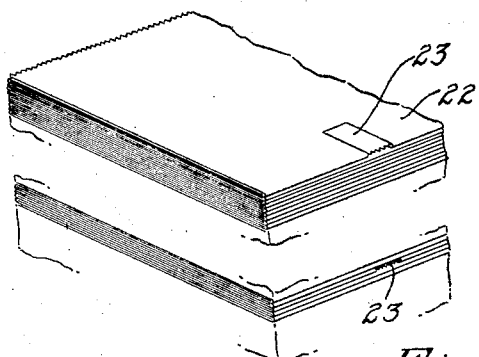
Fig. 7 is a view in perspective illustrating the manner in which the marked article is identified when arranged in package form.
Figure 6:
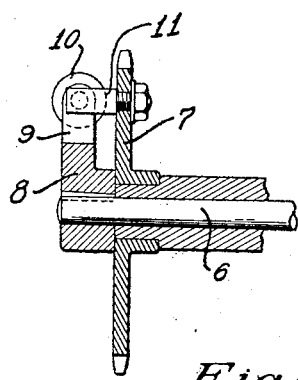
Fig. 6 is a fragmentary detail view in longitudinal section of an adjusting instrumentality.
Figure 8:
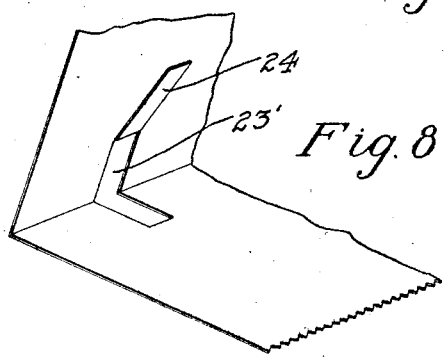
Fig. 8 is a similar view, in fragmentary form, showing the manner in which the mark is made.

The arrangement may be called a recorder, marking a number of interfolded articles so that they can be easily separated when a predetermined number of sheets, for instance, have been packed, and the manner of so identifying the goods may be seen more clearly with reference to Figs. 7 and 8. This constitutes a method of marking or recording sheets of interfolded materials wherein one sheet, cut with serrated edges, is folded into the bend of a succeeding sheet. The sheets, interfolded, are arranged in a pile wherein the cut-out portion of a sheet 22 permits the projection or visualization and feeling of the roughened or serrated portion of the end of a sheet 23, the cut portion constituting an opening or window 23' through which the edge may be seen, and constituting a means of identifying the division line between the different packages. In addition to this there is a tongue 24 formed and bent inwardly during the interfolding of the sheets cut from the web, and this causes a slight thickness of this particular sheet which also aids in the determination of the dividing line between the packages.

From the foregoing, it will be seen that the mechanism described constitutes an effective instrumentality for procuring the objects set forth and that the particular manner of marking the articles constitutes an effective method of determining and identifying the division line between packages containing predetermined numbers of articles. While these have been disclosed in the embodiment herein set forth, it will be understood that we do not wish to be limited to the precise form of this disclosure, as many changes in the general construction and arrangement are contemplated to be within the scope of the invention, as set forth in the claims.

What we claim is:

1. A recording instrumentality including a shaft; a sleeve loosely mounted thereon; a resilient connection between the sleeve and shaft; a marker carried by the sleeve; a cam actuated by the shaft; an arm on the sleeve; and a ratchet mechanism movable into and out of engagement with the arm on the sleeve by the cam.

2. A recording instrumentality including a shaft; a sleeve loosely mounted thereon; a resilient connection between the sleeve and shaft; a marker carried by the sleeve; a cam actuated by the shaft; an arm on the sleeve; and a ratchet mechanism movable into and out of engagement with the arm on the sleeve by the cam; said resilient connection between the shaft and sleeve including a spring secured to the shaft and sleeve.

3. A recording instrumentality including a shaft; a sleeve loosely mounted thereon; a resilient connection between the sleeve and shaft; a marker carried by the sleeve; a cam actuated by the shaft; an arm on the sleeve; a ratchet mechanism movable into and out of engagement with the arm on the sleeve by the cam, said ratchet mechanism including a member slidably mounted in proximity to the arm on the sleeve; and an arm on the sliding member coacting with the arm on the sleeve at predetermined times under the influence of the cam.

4. A recording instrumentality including a shaft; a sleeve loosely mounted thereon; a resilient connection between the sleeve and shaft; a marker carried by the sleeve; a cam actuated by the shaft; an arm on the sleeve; a ratchet mechanism movable into and out of engagement with the arm on the sleeve by the cam, said ratchet mechanism including a member slidably mounted in proximity to the arm on the sleeve; an arm on the sliding member coacting with the arm on the sleeve at predetermined times under the influence of the cam; and a lug on one of the arms adapted to engage and hold the arm on the sleeve when the cam is in one position.

5. A recording instrumentality including a shaft; a sleeve loosely mounted thereon; a resilient connection between the sleeve and shaft; a marker carried by the sleeve; a cam actuated by the shaft; an arm on the sleeve; a ratchet mechanism movable into and out of engagement with the arm on the sleeve by the cam, said ratchet mechanism including a member slidably mounted in proximity to the arm on the sleeve; an arm on the sliding member coacting with the arm on the sleeve at predetermined times under the influence of the cam; a second arm on the sliding member; and a portion of the second arm acting as a stop for the arm on the sleeve when the cam is in another position.

6. A recording instrumentality including a shaft; a sleeve loosely mounted thereon; a tension mechanism connecting the sleeve and shaft; a stop on the sleeve; a ratchet mechanism including a member movable in proximity to the stop; and a cam on the shaft in actuating relation with the sliding member to move it with relation to the stop on the sleeve.

7. A recording instrumentality including a shaft; a sleeve loosely mounted thereon; a tension mechanism connecting the sleeve and shaft; a stop on the sleeve; a ratchet mechanism including a member movable in proximity to the stop; a cam on the shaft in actuating relation with the sliding member to move it with relation to the stop on the sleeve; and an arm on the sliding member having a portion adapted to coact with the stop on the sleeve when the sliding member is in one position.

8. In combination with an interfolding machine having feed and guide rolls, cutting mechanism, interfolding mechanism for folding sheets cut from the web with one edge of one sheet placed within the fold of another sheet, and driving mechanism for these components; a recording instrumentality including a shaft rotatably connected with the driving mechanism; a sleeve on the shaft; a tension mechanism connecting the sleeve and shaft; a stop on the sleeve; a ratchet mechanism including a member movable in relation to the stop; a cam actuated by the stop for moving the ratchet mechanism; one of the rolls being provided with a marker-receiving groove; and a marker associated with the sleeve and adapted to be driven through a portion of the web and into the groove in the roll by the tension mechanism when the ratchet is released from the stop.

9. In combination with an interfolding machine having feed and guide rolls, cutting mechanism, interfolding mechanism for folding sheets cut from the web with one edge of one sheet placed within the fold of another sheet, and driving mechanism for these components; a recording instrumentality including a shaft rotatably connected with the driving mechanism; a sleeve on the shaft; a tension mechanism connecting the sleeve and shaft; a stop on the sleeve; a ratchet mechanism including a member movable in relation to the stop; a cam actuated by the stop for moving the ratchet mechanism; one of the rolls being provided with a marker-receiving groove; a marker associated with the sleeve and adapted to be driven through a portion of the web and into the groove in the roll by the tension mechanism when the ratchet is released from the stop; and means for adjusting the point where the marker will penetrate the web.

10. In combination with an interfolding machine having feed and guide rolls, cutting mechanism, interfolding mechanism for folding sheets cut from the web with one edge of one sheet placed within the fold of another sheet, and driving mechanism for these components; a recording instrumentality including a shaft rotatably connected with the driving mechanism; a sleeve on the shaft; a tension mechanism connecting the sleeve and shaft; a stop on the sleeve; a ratchet mechanism including a member movable in relation to the stop; a cam actuated by the stop for moving the ratchet mechanism; one of the rolls being provided with a marker-receiving groove; a marker associated with the sleeve and adapted to be driven through a portion of the web and into the groove in the roll by the tension mechanism when the ratchet is released from the stop; means for adjusting the point where the marker will penetrate the web, said means including a sprocket loosely mounted on the recorder shaft and connection with the interfolding-machine driving-mechanism; and means for adjustably connecting the sprocket to the recorder shaft.

11. In combination with an interfolding machine having feed and guide rolls, cutting mechanism, interfolding mechanism for folding sheets cut from the web with one edge of one sheet placed within the fold of another sheet, and driving mechanism for these components; a recording instrumentality including a shaft rotatably connected with the driving mechanism; a sleeve on the shaft; a tension mechanism connecting the sleeve and shaft; a stop on the sleeve; a ratchet mechanism including a member movable in relation to the stop; a cam actuated by the stop for moving the ratchet mechanism; one of the rolls being provided with a marker-receiving groove; a marker associated with the sleeve and adapted to be driven through a portion of the web and into the groove in the roll by the tension mechanism when the ratchet is released from the stop; means for adjusting the point where the marker will penetrate the web, said means including a sprocket loosely mounted on the recorder shaft and connection with the interfolding-machine driving-mechanism; means for adjustably connecting the sprocket to the recorder shaft, said means including an arm mounted on the shaft; an adjusting mechanism associated with the arm; and a member on the sprocket forming a component of the adjusting mechanism.

12. In combination with an interfolding machine including feed and guide rolls and interfolding mechanism for feeding a web of material to be cut and interfolded, one edge of one sheet being disposed within the fold of a succeeding sheet; a recording instrumentality including a shaft rotatably mounted in operative relation to one of the feed-rolls; means for rotating the shaft in timed relation to the feeding of the web; a marker associated with said shaft; means for effecting a propulsive engagement of the marker and web in timed relation to the actuation of the interfolding mechanism, said means including tension mechanism associated with the shaft; a ratchet mechanism associated with the tension mechanism; and means for effecting movement of the ratchet.

13. In combination with an interfolding machine including feed and guide rolls and interfolding mechanism for feeding a web of material to be cut and interfolded, one edge of one sheet being disposed within the fold of a succeeding sheet; a recording instrumentality including a shaft rotatably mounted in operative relation to one of the feed-rolls; means for rotating the shaft in timed relation to the feeding of the web; a marker associated with said shaft; means for effecting a propulsive engagement of the marker and web in timed relation to the actuation of the interfolding mechanism, said means including tension mechanism associated with the shaft; a ratchet mechanism associated with the tension mechanism; and means for effecting movement of the ratchet, said tension mechanism including a sleeve, a spring-member connecting the shaft and sleeve whereby rotation of the shaft will place the sleeve under tension, and said releasing mechanism including a cam for effecting release of the sleeve from the ratchet whereby the marker will be actuated with a propulsive force against the web.

14. In combination with an interfolding machine having feed and guide rolls for a web of material to be cut and interfolded into sheets and mechanism for interfolding of an edge of one sheet into the fold of another; a shaft rotatively mounted in proximity to one of the feed-rolls and in timed rotative association with the interfolding mechanism; a sleeve rotatably mounted on said shaft; a spring-member connecting the sleeve and shaft; a ratchet-member associated with the sleeve; a holding member on the sleeve and normally engaging the ratchet whereby the sleeve is held while the rotation of the shaft places the spring under tension; a marker disposed on the sleeve; and a cam-member associated with the shaft and actuatable at predetermined times to effect release of the sleeve and ratchet whereby the marker will be driven with a propulsive force by the spring against the web of material to be cut and interfolded.

15. A method of segregating and separating interfolded sheets of material which consists in cutting a piece of material from a web of material being fed to interfolding mechanism; said cut portion of the web being disposed at a point which will later be a fold, and the cut portion constituting a window or opening exposing an edge of a second sheet placed within the fold.

16. The method of marking a definite number of cut and interfolded articles in a package which consists in cutting a portion from a web as it is being fed to an interfolding mechanism, the cut portion constituting a window to expose an edge of a sheet placed in the fold.

17. The method of marking interfolded sheets which consists in cutting an opening in a web of material as it is being fed to interfolding mechanism, the cut portion bearing a fixed relation to a portion of the web which is later to be a fold; and folding the cut portion of the web so as to expose the edge of a sheet placed within the fold.

18. In combination with an interfolding machine having feed and guide rolls, cutting mechanism, interfolding mechanism for folding sheets cut from the web with one edge of one sheet placed within the fold of another sheet, and driving mechanism for these components; a recording instrumentality including a shaft rotatably connected with the driving mechanism; a sleeve on the shaft; a tension mechanism connecting the sleeve and shaft; a stop on the sleeve; a ratchet mechanism including a member movable in relation to the stop; a cam actuated by the stop for moving the ratchet mechanism; one of the rolls being provided with a marker-receiving groove; a marker associated with the sleeve and adapted to be driven through a portion of the web and into the groove in the roll by the tension mechanism when the ratchet is released from the stop; means for adjusting the point where the marker will penetrate the web, said means including a sprocket loosely mounted on the recorder shaft and connection with the interfolding-machine driving-mechanism; means for adjustably connecting the sprocket to the recorder shaft, said means including an arm mounted on the shaft; spaced apart members on the arm; a stop on the sprocket and extending into proximity with the spaced-apart members; and an adjustable mechanism associated with the spaced apart members for connecting the arm with the stop on the sprocket.

19. In combination with an interfolding machine having feed and guide rolls, cutting mechanism, interfolding mechanism for folding sheets cut from the web with one edge of one sheet placed within the fold of another sheet, and driving mechanism for these components; a recording instrumentality including a shaft rotatably connected with the driving mechanism; a sleeve on the shaft; a tension mechanism connecting the sleeve and shaft; a stop on the sleeve; a ratchet mechanism including a member movable in relation to the stop; a cam actuated by the stop for moving the ratchet mechanism; one of the rolls being provided with a marker-receiving groove; a marker associated with the sleeve and adapted to be driven through a portion of the web and into the groove in the roll by the tension mechanism when the ratchet is released from the stop; means for adjusting the point where the marker will penetrate the web, said means including a sprocket loosely mounted on the recorder shaft and connection with the interfolding - machine driving - mechanism; means for adjustably connecting the sprocket to the recorder shaft, said means including an arm mounted on the shaft; spaced apart members on the arm; a stop on the sprocket and extending into proximity with the spaced-apart members; an adjustable mechanism associated with the spaced apart members for connecting the arm with the stop on the sprocket; and means for adjusting the position of the stop on the sprocket.

20. The method of marking a definite number of cut and interfolded articles in a package, which consists in cutting a portion from a web of material being fed in the interfolding machine, a part of the web so cut producing a thickening of the interfolded articles at a predetermined point in the folded article, the thickened portion occurring at predetermined intervals in the finished articles and serving to indicate a definite number of articles between the intervals where these thickened portions occur.

In testimony whereof we affix our signatures in the presence of two witnesses.

WILLIAM H. CANNARD.
GLENN A. SHAFFER.

Witnesses:
 Eva L. Looze,
 Vivian Greenwood.